United States Patent
Spörrer et al.

(10) Patent No.: US 7,472,538 B2
(45) Date of Patent: Jan. 6, 2009

(54) METHOD FOR PRODUCING ROLLERS AND SLEEVES FOR CHAINS

(75) Inventors: Joachim Spörrer, Erlangen (DE); Olaf Donath, Herzogenaurath (DE); Georg Backert, Herzogenaurach (DE); Michael Dotterweich, Herzogenaurach (DE); Alexander Fichtner, Herzogenaurach (DE); German Lang, Herzogenaurach (DE)

(73) Assignee: Schaeffler KG, Herzogenaurach (DE)

( * ) Notice: Subject to any disclaimer, the term of this patent is extended or adjusted under 35 U.S.C. 154(b) by 0 days.

(21) Appl. No.: 11/880,102

(22) Filed: Jul. 18, 2007

(65) Prior Publication Data

US 2008/0072563 A1    Mar. 27, 2008

Related U.S. Application Data

(60) Provisional application No. 60/833,424, filed on Jul. 26, 2006.

(30) Foreign Application Priority Data

Jul. 21, 2006    (DE) ........................ 10 2006 033 735

(51) Int. Cl.
*B21L 9/02* (2006.01)
*F16G 13/06* (2006.01)

(52) U.S. Cl. ........................ 59/4; 59/8; 59/35.1; 59/78; 29/898.1; 384/283

(58) Field of Classification Search ........................ 59/4, 59/5, 8, 35.1, 78; 384/283, 284, 291, 569; 29/898.1

See application file for complete search history.

(56) References Cited

U.S. PATENT DOCUMENTS

| | | | | | |
|---|---|---|---|---|---|
| 1,473,855 | A | * | 11/1923 | Herford et al. | 59/5 |
| 3,426,522 | A | * | 2/1969 | Onulak | 59/8 |
| 3,583,153 | A | * | 6/1971 | Schafer | 59/4 |
| 3,969,889 | A | * | 7/1976 | Araya | 59/8 |
| 4,237,717 | A | * | 12/1980 | Kohmaier | 59/8 |
| 5,697,206 | A | * | 12/1997 | Otani et al. | 59/4 |
| 6,393,818 | B1 | * | 5/2002 | Nakagawa et al. | 59/4 |
| 2002/0110301 | A1 | * | 8/2002 | Niina | 384/569 |

FOREIGN PATENT DOCUMENTS

| | | |
|---|---|---|
| DE | 390 040 C | 2/1924 |
| DE | 29 17 607 A1 | 11/1979 |
| DE | 38 09 841 C1 | 5/1989 |
| FR | 628.448 A | 10/1927 |
| GB | 2 216 833 A | 10/1989 |

* cited by examiner

*Primary Examiner*—David B Jones
(74) *Attorney, Agent, or Firm*—Alfred J. Mangels

(57) ABSTRACT

A method or producing rollers and sleeves for chains, particularly for roller chains or sleeve-type chains. The rollers and sleeves are of cylindrical form and they are deep-drawn from a sheet metal material. The drawn components can remain attached to the sheet metal for convenience in transporting them and later separated from the sheet as they are needed. Alternatively, the drawn components can be separated from the sheet metal material and can be pressed into the openings that remain in the sheet metal, again for convenient transportation.

3 Claims, 2 Drawing Sheets

METHOD FOR PRODUCING ROLLERS AND SLEEVES FOR CHAINS

BACKGROUND OF THE INVENTION

1. Field of the Invention

The present invention relates to a method for producing rollers and sleeves for chains, in particular for roller chains and sleeve-type chains.

2. Description of the Related Art

In roller chains and sleeve-type chains, the chain links include sleeves that are secured in recesses of the links. In a roller chain, in addition loose rollers are guided by way of the sleeves. In that way, better roll-off performance between the teeth of a sprocket wheel and the chain can be achieved.

It is known to make the rollers and sleeves from a sheet metal material, in particular strip material. To that end, in a known method the sheet metal material is rolled into a cylindrical form, in order to form a roller or sleeve. In accordance with another known method, the rollers and sleeves are extruded. Those known manufacturing methods are very elaborate and cost-intensive due in particular to the fact that seamless fabrication is not possible, so that the seams have to be reworked. Furthermore, with the known methods, in particular rolling methods, it is not possible to produce an ideal circular shape nor a defined diameter of the rollers and sleeves. In addition, because alignment of the butt joint is necessary, the strength of the produced rollers and sleeves is reduced.

An object of the present invention is to provide an improved method for producing rollers and sleeves of the type identified above so that fabrication-optimized production is made possible.

SUMMARY OF THE INVENTION

The object is achieved in accordance with the present invention by a method for producing rollers and sleeves for chains, in particular for roller chains or sleeve-type chains, wherein the rollers and sleeves are deep-drawn from a sheet metal material.

DESCRIPTION OF THE PREFERRED EMBODIMENTS

Through the use of drawing technology in the production method in accordance with the invention, the quality of the rollers and sleeves produced can be improved so that reworking is nearly unnecessary, and seamless fabrication is achieved. In addition, when using drawing technology high cycle speeds can be achieved compared to extruding or rolling, so that the proposed method is substantially more cost-effective.

Figure 1:
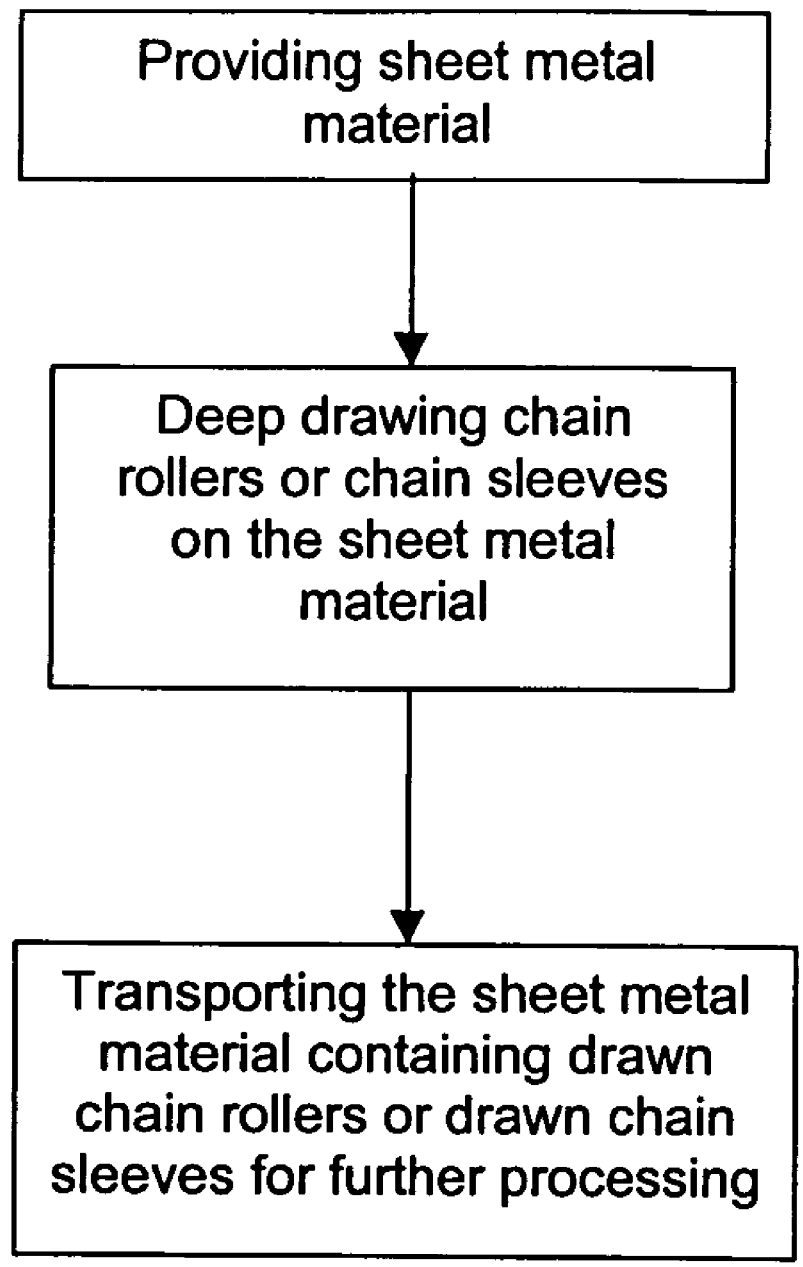
FIG. 1 is a flow chart showing method steps for a first embodiment of the present invention.

In the method in accordance with the invention, as shown in FIG. 1, the deep-drawn rollers or sleeves can remain initially on the sheet metal material, in order to be transported with the sheet metal in the simplest way for further processing, or the like.

Figure 2:
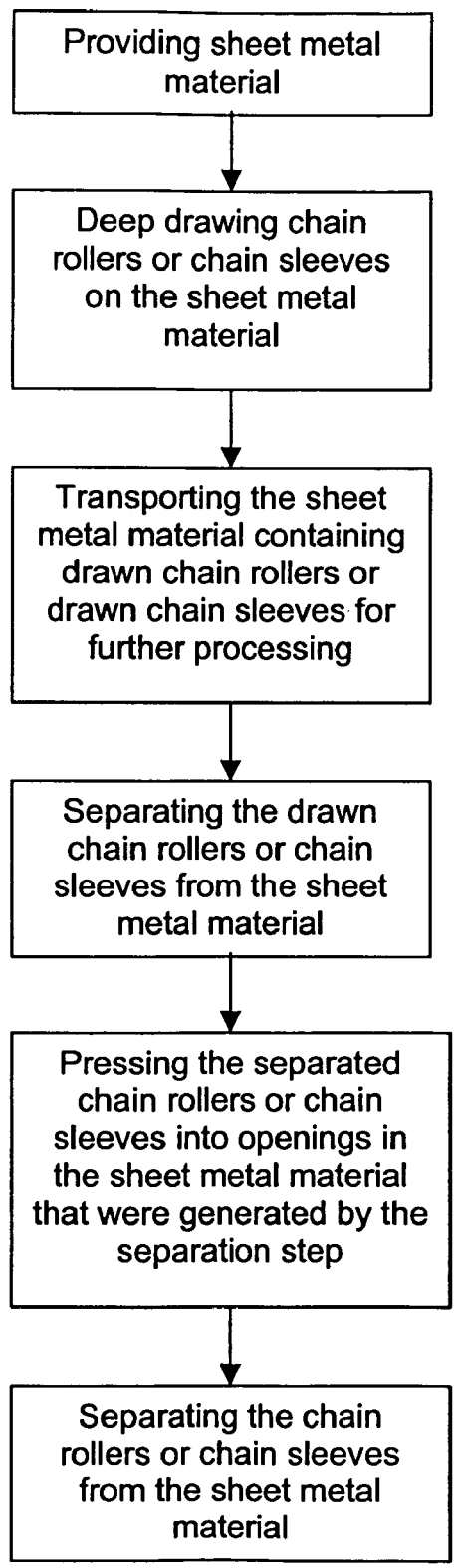
FIG. 2 is a flow chart showing method steps for a second embodiment of the present invention.

It is also possible, in accordance with a refinement of the invention, for the deep-drawn rollers and sleeves to be separated from the sheet metal material, as shown in FIG. 2. In that case it is especially advantageous, in conjunction with a next embodiment of the present invention, if the separated rollers and sleeves are again pressed into the openings or the like that were generated in the sheet metal material by the separation, so that the rollers and sleeves can be held on the sheet metal material. That enables especially simple transport of the sleeves and rollers, which are usually very small. At the end of the fabrication of the rollers and sleeves, they can then be removed from the sheet metal material, for example by a punch, or the like.

Through the use of drawing technology in the fabrication of sleeves and rollers for roller chains and sleeve-type chains, it is especially beneficial that in addition to the high cycle frequency, fabrication of the sleeves and rollers in a plurality of parallel paths is also possible. In that way, the output of the method in accordance with the invention can be further increased.

Although particular embodiments of the present invention have been described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A method for producing rollers and sleeves for roller chains and sleeve-type chains, including the steps of: providing a sheet metal material; deep-drawing components in the form of at least one of rollers and sleeves from the sheet metal material; separating the deep-drawn components from the sheet metal material; and pressing the separated components into openings in the sheet metal material that result from the separation.

2. A method in accordance with claim 1, including the step of removing the components from the sheet metal material at the end of fabrication.

3. A method in accordance with claim 1, including the step of fabricating the components in a plurality of paths that are parallel to each other.

* * * * *